United States Patent
Kim et al.

(10) Patent No.: US 7,256,759 B2
(45) Date of Patent: Aug. 14, 2007

(54) LIQUID CRYSTAL DISPLAY DEVICE

(75) Inventors: Woo Hyun Kim, Seoul (KR); Kyung Kwon Park, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 520 days.

(21) Appl. No.: 10/743,173

(22) Filed: Dec. 22, 2003

(65) Prior Publication Data
US 2005/0052400 A1    Mar. 10, 2005

(30) Foreign Application Priority Data
Dec. 31, 2002   (KR) .................. 10-2002-0087763

(51) Int. Cl.
G09G 3/36  (2006.01)
(52) U.S. Cl. ........................ 345/87; 345/100
(58) Field of Classification Search ............ 345/87, 345/98, 100, 204, 205
See application file for complete search history.

(56) References Cited

U.S. PATENT DOCUMENTS 6,072,457 A * 6/2000 Hashimoto et al. ......... 345/100
6,583,777 B2 * 6/2003 Hebiguchi et al. ........... 345/92
6,825,822 B2 * 11/2004 Lee ............................. 345/87

FOREIGN PATENT DOCUMENTS

KR    2003-61553    7/2003

* cited by examiner

*Primary Examiner*—Amr A. Awad
*Assistant Examiner*—Tom V. Sheng
(74) *Attorney, Agent, or Firm*—Brinks Hofer Gilson & Lione

(57) ABSTRACT

A liquid crystal display device is disclosed, which provides data in a time-divided manner to left and right pixel regions of one data line, thereby reducing the number of source drive ICs, expensive component. The liquid crystal display device includes a plurality of pairs having first and second gate lines being adjacent to each other; a plurality of data lines for being in perpendicular to the pair of the first and second gate lines, thereby defining a plurality of left and right side pixel regions; and left and right side pixel electrodes, respectively formed in the left and right side pixel regions, and selectively driven by switching parts of the first and second gate lines.

66 Claims, 9 Drawing Sheets

| Select1 | Select2 | driving gate line |
|---------|---------|-------------------|
| H | L | first gate line |
| L | H | second gate line |

LIQUID CRYSTAL DISPLAY DEVICE

This application claims the benefit of the Korean Application No. P2002-87763 filed on Dec. 31, 2002, which is hereby incorporated by reference.

BACKGROUND OF THE INVENTION

1. Field of the Invention

The present invention relates to a liquid crystal display (LCD) device, and more particularly, to an LCD device for providing data in a time-divided manner to left and right pixel regions of one data line, thereby reducing the number of source drive ICs, expensive component.

2. Discussion of the Related Art

Recently, with the increasing development of an information-based society, demands for various display devices have increased. Accordingly, much effort has been expended to research and develop various flat display devices such as a liquid crystal display (LCD), plasma display panel (PDP), electroluminescent display (ELD), and vacuum fluorescent display (VFD), and some species of the flat display devices are already applied to displays of various equipment.

Among the various flat display devices, the liquid crystal display (LCD) device has been most widely used due to advantageous characteristics of thinness, lightness in weight, and low power consumption, whereby the LCD device substitutes for Cathode Ray Tube (CRT). In addition to the mobile type LCD devices such as a display for a notebook computer, the LCD devices have been developed for computer monitors and televisions to receive and display broadcasting signals.

Despite various technical developments in the LCD technology with applications in different fields, research in enhancing the picture quality of the LCD device has been in some respects lacking as compared to other features and advantages of the LCD device. In order to use the LCD device in various fields as a general display, the key to developing the LCD device lies on whether the LCD device can implement a high quality picture, such as high resolution and high luminance with a large-sized screen while still maintaining lightness in weight, thinness, and low power consumption.

Generally, the LCD device is driven according to the optical anisotropy and polarizability of the liquid crystal. Liquid crystal molecules are aligned with directional characteristics since the liquid crystal molecules respectively have long and thin shapes. In this respect, an electric field is applied to the liquid crystal for controlling the alignment direction of the liquid crystal molecules. That is, if the alignment direction of the liquid crystal molecules is controlled by the electric field, the light is polarized and changed by the optical anisotropy of the liquid crystal, thereby displaying the picture image.

The liquid crystal is classified into a positive (+) type liquid crystal having positive dielectric anisotropy and a negative (−) type liquid crystal having negative dielectric anisotropy according to electrical characteristics of the liquid crystal. In the positive (+) type liquid crystal, a longitudinal axis of a positive (+) liquid crystal molecule is parallel to the electric field applied to the liquid crystal. Meanwhile, in the negative (−) type liquid crystal, a longitudinal axis of a negative (−) liquid crystal molecule is perpendicular to the electric field applied to the liquid crystal.

Recently, an active matrix LCD (AM-LCD), in which a thin film transistor and a pixel electrode connected to the thin film transistor are arranged in a matrix, has attracted considerable attention due to the ability to display high resolution and great moving picture images. The AM-LCD device largely includes an LCD panel displaying a picture image and a driving part applying a driving signal to the LCD panel. Also, the LCD panel includes first and second glass substrates bonded to each other at a predetermined interval and a liquid crystal layer injected between the first and second glass substrates.

The first glass substrate (TFT array substrate) includes a plurality of gate and data lines, a plurality of pixel electrodes, and a plurality of thin film transistors. The plurality of gate lines are formed on the first glass substrate at fixed intervals in one direction and the plurality of data lines are formed at fixed intervals perpendicular to the plurality of gate lines. The plurality of pixel electrodes in the matrix are respectively formed in pixel regions defined by the plurality of gate and data lines crossing each other. The plurality of thin film transistors are switched according to signals of the gate lines for transmitting signals of the data lines to the respective pixel electrodes.

Also, the second glass substrate (color filter substrate) includes a black matrix layer excluding light from regions except the pixel regions of the first substrate, R/G/B color filter layer displaying various colors, and a common electrode obtaining the picture image. Next, a predetermined space is maintained between the first and second glass substrates by spacers, and the first and second substrates are bonded to each other by a sealant pattern having a liquid crystal injection inlet. The liquid crystal layer is injected between the first and second glass substrates.

The thin film transistor TFT-LCD device is classified into an amorphous silicon type and a polysilicon type according to characteristics of a semiconductor layer. For improving yield in the amorphous silicon and polysilicon types, it is important to simplify manufacturing process steps. That is, the amorphous silicon uses a Chemical Vapor Deposition CVD method at a low temperature, so that it is useful for the LCD device using the glass substrate. However, the amorphous silicon type has low carrier mobility and thus is not appropriate for a transistor of a drive IC requiring a rapid operation time. Thus, an additional drive IC driving the LCD device is required and attached to the periphery of the LCD panel. The additional drive IC complicates the manufacturing process steps, thereby increasing manufacturing cost.

In comparison with the amorphous silicon type, the polysilicon type has a large carrier mobility, so that it is appropriate for forming the drive IC. In this case, when using the polysilicon as the semiconductor layer for the thin film transistor of the LCD device, it is possible to form the thin film transistor for the pixel electrode, and the transistor for the drive IC on the same glass substrate, thereby decreasing manufacturing cost by obtaining simplified manufacturing process steps for the module and realizing low power consumption.

Hereinafter, a pixel structure of a related art LCD device will be described with reference to the accompanying drawings. FIG. 1 is a plan view illustrating the pixel of the related art LCD device, and FIG. 2 is a cross-sectional view taken along line A-A' of FIG. 1.

As shown in FIG. 1, the related art LCD device includes a plurality of gate lines 11, and a plurality of data lines 12 perpendicular to the respective gate lines 11 at fixed intervals. At this time, a plurality of pixel regions are defined by the plurality of gate and data lines 11 and 12 crossing each other. Also, a thin film transistor TFT is formed at each crossing point of the gate and data lines 11 and 12, and a pixel electrode 13 is formed in each pixel region that is connected to a drain electrode 12b of the thin film transistor TFT.

A structure of the thin film transistor will be described with reference to FIG. 2. Referring to FIG. 2, a gate electrode 11a protruding from the gate line 11 is formed on a glass substrate 10, and then a gate insulating layer 15 is formed on an entire surface of the glass substrate 10 including the gate electrode 11a. After that, a semiconductor layer 16 is formed on the gate insulating layer 15 above the gate electrode 11a, and then source and drain electrodes 12a and 12b are formed on both sides of the semiconductor layer 16. Then, a passivation layer 17 is formed on the entire surface of the semiconductor layer 16 and the drain electrode 12b, and the pixel electrode 13 is connected with the drain electrode 12b.

FIG. 3 is an equivalent circuit diagram of the pixel structure in the LCD device of FIG. 1. As shown in FIG. 3, the plurality of thin film transistors TFTs are formed at the respective crossing points between the plurality of gate lines $G_1, G_2, \ldots, G_{n-1}, G_n$ and data lines $S_1, S_2, \ldots, S_{n-1}, S_n$, and a liquid crystal capacitor $C_{LC}$ is connected to the drain electrode of the thin film transistor. The liquid crystal capacitor $C_{LC}$ is not an additional device, but is formed of liquid crystal serving as dielectric defining the pixel electrode of the first substrate, and the common electrode of the second substrate as first and second electrodes. The liquid crystal capacitor $C_{LC}$ maintains a data voltage value charged in each pixel electrode at a predetermined time period.

Although not shown, an additional storage capacitor $C_{st}$ is formed between the pixel electrode and the common electrode, so that it is possible to control charging time of liquid crystal. Meanwhile, when forming the polysilicon thin film transistor TFT, a selector switch is mounted in the substrate. At this time, two data lines are driven with one output applied from a source drive IC to each data line, so that it is possible to reduce the number of source drive ICs, and to increase contact pitch. However, the related art has limitation in that the number of data lines is not reduced in the pixel structure. Also, it is required to obtain the selector switches corresponding to output lines in an output terminal of the source drive IC. Furthermore, the entire size becomes large due to the selector switches.

A driving method of the LCD device will be described with reference to FIG. 3. When a driving voltage (pulse signal) is applied to each gate line $G_1, G_2, \ldots, G_{n-1}, G_n$, each thin film transistor TFT connected to the corresponding gate line $G_1, G_2, \ldots, G_{n-1}, G_n$ is turned on. Thus, the data voltage applied to each data line $S_1, S_2, \ldots, S_{n-1}, S_n$ is applied to the pixel electrode, so that the data voltage is charged. At this time, the data voltage is charged in each pixel electrode 13 at a cycle of one frame, and then is maintained when the next signal is applied thereto.

Each pixel electrode of the LCD device is independently driven according to a scanning signal applied to each gate line $G_1, G_2, \ldots, G_{n-1}, G_n$. Herein, the driving method of the LCD device will be described on the basis of voltage discharge of the corresponding pixel according to the operation of one thin film transistor.

In a selection block Ts of a predetermined gate line, a voltage Vg(on) is applied to the gate line connected to a gate drive IC, which is higher than that of the data line, so that a channel resistance becomes low between drain and source electrodes. Also, the voltage output from a source drive IC to each data line is applied to liquid crystal layer through the pixel electrode. In a non-selection block Tns of the predetermined gate line, a voltage Vg(off) is applied to the gate line, which is lower than that of the data line, whereby the drain electrode is electrically insulated from the source electrode, thereby maintaining electric charge in the liquid crystal layer during the selection block Ts. Thus, when applying the voltage Vg(on) to the gate line, the voltage is applied to the liquid crystal layer by charging each pixel electrode through the data line.

As a controlling RMS voltage is applied to the liquid crystal layer between the pixel electrode and the common electrode, linearly polarized light passing through a polarizing plate is changed by passing through the liquid crystal layer, and then is selectively transmitted by an analyzing plate, thereby displaying information as luminosity of the pixel. Also, polarity of the voltage applied to the liquid crystal layer is controlled at each cycle by controlling wave of the voltage applied to the data line and the common electrode (not shown), thereby preventing electrochemical reaction of liquid crystal molecules.

At this time, one cycle Tf of the scanning signal is a total of the selection block Ts and the non-selection block Tns. When transmitting a picture at 60 Hz, one cycle is about 16.7 msec, and the selection block Ts is about 21.7 μsec (=16.7 msec/768) in case of an XGA class display (1024×768 pixels). For maintaining the voltage applied to the pixel electrode 13 in the selection block Ts during the non-selection block Tns, the storage capacitor $C_{st}$ (not shown) is provided in parallel with the liquid crystal capacitor $C_{LC}$. At this time, the storage capacitor $C_{st}$ is formed of one electrode of the preceding gate line or one electrode of an additional storage line. Also, the storage capacitor $C_{st}$ is comprised of the pixel electrode opposing to the one electrode, and the gate insulating layer or the passivation layer between the two electrodes.

However, the related art LCD device has the following disadvantages.

If the related art is applied to a high resolution panel, the number of gate and data lines forming the pixel regions is increased, so that it is necessary to obtain the plurality of gate drive ICs and source drive ICs corresponding to the number of the gate and data lines, respectively.

For example, for an XGA class display (1024×768), the related art LCD device requires eight source drive ICs, each having 384 pins, and three gate drive ICs, each having 256 pins, corresponding to the 3072 data lines (since one pixel is comprised of R, G and B sub pixels, 1024×3) and 768 gate lines.

At this time, the source drive IC is more expensive than the gate drive IC. In addition, the source drive IC has a power consumption of about 100 mW while the gate drive IC has power consumption of about 20 mW. Since the number of the source drive ICs is greater than the number of the gate drive ICs, the manufacturing cost and power consumption are determined according to the number of the source drive ICs.

Also, when obtaining high resolution in the same size panel, the width of each of the pixels becomes smaller, so that it becomes harder to form a Chip On Film COF or Tape Carrier Package TCP for mounting the drive IC corresponding to the pixel structure.

SUMMARY OF THE INVENTION

Accordingly, embodiments of the present invention are directed to a liquid crystal display (LCD) device that substantially obviates one or more problems due to limitations and disadvantages of the related art.

Embodiments of the present invention provide an LCD device for providing data in a time-divided manner to left and right pixel regions of one data line, thereby reducing the number of source drive ICs, expensive component.

Additional advantages and features of the embodiments of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

In one embodiment, a liquid crystal display device comprises a plurality of pairs of gate lines including first and second gate lines adjacent to each other; a plurality of data lines perpendicular to the first and second gate lines, thereby defining a plurality of left and right side pixel regions, and left and right side pixel electrodes, respectively formed in the left and right side pixel regions, and selectively driven by switching parts of the first and second gate lines.

The first and second gate lines of one pair of gate lines may respectively drive the left and right side pixel electrodes connected with the same data line.

The left and right side pixel electrodes may be overlapped with a preceding or corresponding pair of the gate lines. In this case, the right side pixel electrode may be overlapped with the first and second gate lines of the preceding pair, and the left side pixel electrode overlapped with the first gate line of the corresponding pair and the second gate line of the preceding pair and/or the left side pixel electrode overlapped with the first and second gate lines of the preceding pair and the right side pixel electrode overlapped with the first gate line of the corresponding pair and the second gate line of the preceding pair. The storage capacitors may be formed at an overlapping portion between the left or right side pixel electrode and each gate line.

The liquid crystal display device may comprise a plurality of source drive ICs in which a number of source drive ICs equal to a number of colors in each pixel region times a number of data lines divided by twice a number of outputs in each source drive IC.

The liquid crystal display device may comprise a plurality of the gate drive ICs, each gate drive IC having a plurality of scanning signal output terminals, each scanning signal output terminal corresponding to a particular pair of the pairs of the gate lines and supplying a scanning signal to the particular pair, and a plurality of the selection parts, each selection part time-dividing the scanning signal output from a particular scanning signal output terminal of one of the gate drive ICs and selectively applying the time-divided scanning signal to the first or second gate line of the particular pair.

The display may be an XGA class display which contains 1536 data lines and 1536 gate lines. If a picture is transmitted at 60 Hz, a selection block of a scanning signal applied to each gate line may be about 10.85 μs or about 21.7 μs. Exactly 3 or 6 gate drive ICs may be provided, each gate drive IC having 256 pins and/or exactly four source drive ICs may be provided, each source drive IC having 384 pins.

The liquid crystal display device may comprise a plurality of source drive ICs, a number of the source drive ICs smaller than a number of the gate drive ICs.

In another embodiment, a liquid crystal display device comprises: a plurality of pairs of gate lines, each pair of gate lines including first and second gate lines adjacent to each other; a plurality of data lines perpendicular to the pair of the first and second gate lines, thereby defining a plurality of left and right side pixel regions; left and right side pixel electrodes, respectively formed in the left and right side pixel regions, and selectively driven by switching parts of the first and second gate lines, a gate drive IC having a scanning signal output terminal corresponding to one of the pairs of the gate lines, the scanning signal output terminal supplying a scanning signal; and a selection part time-dividing the scanning signal output from the gate drive IC and selectively applying the time-divided scanning signal to the first or second gate line of the one of the pairs of the gate lines.

The scanning signal output from the gate drive IC may be divided into a first signal and a second signal which are then applied to the first and second gate lines, respectively.

The selection part may include: a first selection switch activated by a first clock signal to apply the scanning signal to the first gate line of the one of the pairs of gate lines; and a second selection switch activated by a second clock signal having a phase difference of 180° with respect to the first clock signal, the second clock signal applying the scanning signal to the second gate line of the one of the pairs of gate lines when activated.

The selection part may include: a first logic circuit that combines the scanning signal and a first clock signal, an output of the first logic circuit connected with the first gate line of the one of the pairs of gate lines; and a second logic circuit that combines the scanning signal and a second clock signal, the second clock signal having a phase difference of 180° with respect to the first clock signal, the first logic circuit connected with the second gate line of the one of the pairs of gate lines.

The selection part may include: a first AND gate receiving and logically combining the scanning signal and a first clock signal, then outputting the combination of the scanning signal and the first clock signal to the first gate line of the one of the pairs of gate lines; and a second AND gate receiving and logically combining the scanning signal and a second clock signal having a phase difference of 180° with respect to the first clock signal, then outputting the combination of the scanning signal and the second clock signal to the second gate line of the one of the pairs of gate lines.

The liquid crystal display device may comprise a plurality of source drive ICs, a number of source drive ICs equal to a number of colors in each pixel region times a number of data lines divided by twice a number of outputs in each source drive IC.

The liquid crystal display device may comprise a plurality of the gate drive ICs, each gate drive IC having a plurality of scanning signal output terminals, each scanning signal output terminal corresponding to a particular pair of the pairs of the gate lines and supplying a scanning signal to the particular pair; and a plurality of the selection parts, each selection part time-dividing the scanning signal output from a particular scanning signal output terminal of one of the gate drive ICs and selectively applying the time-divided scanning signal to the first or second gate line of the particular pair.

The display may be an XGA class display which contains 1536 data lines and 1536 gate lines. If a picture is transmitted at 60 Hz, a selection block of a scanning signal applied to each gate line may be about 21.7 μs. The liquid crystal display device may comprise exactly four source drive ICs, each source drive IC having 384 pins and/or a plurality of source drive ICs, a number of the source drive ICs smaller than a number of the gate drive ICs.

In another embodiment, a liquid crystal display device comprises: a plurality of sets of adjacent gate lines; a plurality of data lines perpendicular to the gate lines; a plurality of sets of pixel regions, each set of pixel regions containing at least two pixel regions and bounded by adjacent data lines and, at furthest, gate lines most distal from each other in adjacent sets of the sets of the adjacent gate lines, no pixel region overlapping any other pixel region; and a plurality of sets of pixel electrodes, each pixel electrode disposed in a particular pixel region and overlapping greater than one gate line.

Adjacent pixel electrodes may overlap different gate lines. Each pixel electrode may overlap exactly two gate lines. At least one pixel electrode of adjacent pixel electrodes may overlap at least two gate lines of one of the sets of adjacent gate lines and/or overlap one of the gate lines of a first set of the sets of adjacent gate lines and one of the gate lines of a second set of the sets of adjacent gate lines. Each set of adjacent gate lines may comprise exactly two adjacent gate lines.

The liquid crystal display device may comprise a plurality of storage capacitors, each storage capacitor formed by the overlap between one of the pixel electrodes and one of the gate lines.

The liquid crystal display device may comprise: a gate drive IC having a scanning signal output terminal corresponding to at least one of the sets of adjacent gate lines, the scanning signal output terminal supplying a scanning signal; and a selection part time-dividing the scanning signal output from the gate drive IC and selectively applying the time-divided scanning signal to the gate lines of the one of the sets of adjacent gate lines. The scanning signal output from the gate drive IC may be divided into a plurality of output signals and each output signal is supplied to a different gate line of the one of the sets of gate lines. The selection part may include a plurality of selection switches which are each activated at different, non-overlapping times. The selection switches may be activated by different clock signals. The selection part may include a plurality of logic circuits which are each activated at different, non-overlapping times. Each logic circuit may combine the scanning signal and a different clock signal of a plurality of clock signals. The logic circuits may be AND gates.

The one of the sets of adjacent gate lines may include exactly two gate lines: a first gate line and a second gate line. In this case, the selection part may include: a first AND gate receiving and logically combining the scanning signal and a first clock signal, then outputting the combination of the scanning signal and the first clock signal to the first gate line; and a second AND gate receiving and logically combining the scanning signal and a second clock signal having a phase difference of 180° with respect to the first clock signal, then outputting the combination of the scanning signal and the second clock signal to the second gate line.

The liquid crystal display device may comprise a plurality of source drive ICs, a number of source drive ICs equal to (a number of colors in each pixel region times a number of data lines) divided by (a number of outputs in each source drive IC times a number of adjacent gate lines in each set of the adjacent gate lines).

The liquid crystal display device may comprise a plurality of gate drive ICs, each gate drive IC having a plurality of scanning signal output terminals, each scanning signal output terminal corresponding to a particular set of the sets of the gate lines and supplying a scanning signal to the particular set; and a plurality of selection parts, each selection part time-dividing the scanning signal output from a particular scanning signal output terminal of one of the gate drive ICs and selectively applying the time-divided scanning signal to one of the gate lines of the particular set.

The liquid crystal display device may comprise a plurality of gate drive ICs supplying signals to the gate lines and a plurality of source drive ICs supplying signals to the data lines, a number of the source drive ICs smaller than a number of the gate drive ICs.

In another embodiment, a method of fabricating a liquid crystal display device comprises: forming a plurality of sets of adjacent gate lines; forming a plurality of data lines perpendicular to the gate lines; and forming a plurality of sets of pixel electrodes, each set of pixel electrodes containing at least two pixel electrodes, each set of pixels bounded by adjacent data lines and, at furthest, gate lines most distal from each other in adjacent sets of the sets of the adjacent gate lines, each pixel electrode overlapping greater than one gate line and no pixel electrode overlapping any other pixel electrode.

The method may comprise forming the pixel electrodes such that adjacent pixel electrodes overlap different gate lines.

The method may comprise forming the pixel electrodes such that each pixel electrode overlaps exactly two gate lines.

The method may comprise forming the pixel electrodes such that at least one pixel electrode of adjacent pixel electrodes overlaps at least two gate lines of one of the sets of adjacent gate lines.

The method may comprise forming the pixel electrodes such that at least one pixel electrode of adjacent pixel electrodes overlaps one of the gate lines of a first set of the sets of adjacent gate lines and one of the gate lines of a second set of the sets of adjacent gate lines.

The method may comprise forming the gate lines such that each set of adjacent gate lines comprises exactly two adjacent gate lines.

The method may comprise forming a plurality of storage capacitors, each storage capacitor formed by the overlap between one of the pixel electrodes and one of the gate lines.

The method may comprise connecting a scanning signal output terminal of a gate drive IC with at least one of the sets of adjacent gate lines, the scanning signal output terminal supplying a scanning signal, time-dividing the scanning signal output from the gate drive IC using a selection part, and selectively applying the time-divided scanning signal to the gate lines of the one of the sets of adjacent gate lines. In this case, the method may comprise dividing the scanning signal output from the gate drive IC into a plurality of output signals and supplying each output signal to a different gate line of the one of the sets of gate lines. The method may comprise activating each of a plurality of selection switches of the selection part at different, non-overlapping times. The method may comprise activating the selection switches using different clock signals. The method may comprise activating each of a plurality of logic circuits of the selection part at different, non-overlapping times. The method may comprise providing the logic circuits such that each logic circuit combines the scanning signal and a different clock signal of a plurality of clock signals. The method may comprise providing AND gates as the logic circuits. The method may comprise forming the gate lines such that the one of the sets of adjacent gate lines includes exactly two gate lines: a first gate line and a second gate line. The method may comprise receiving and logically combining the scanning signal and a first clock signal and then outputting the combination of the scanning signal and the first clock signal to the first gate line using a first AND gate, and receiving and logically combining the scanning signal and a second clock signal having a phase difference of 180° with respect to the first clock signal and then outputting the combination of the scanning signal and the second clock signal to the second gate line using a second AND gate.

The method may comprise connecting a number of source drive ICs equal to (a number of colors in each pixel region in which each pixel electrode is formed times a number of data lines) divided by (a number of outputs in each source drive IC times a number of adjacent gate lines in each set of the adjacent gate lines) with the data lines.

The method may comprise connecting a plurality of scanning signal output terminals of a plurality of gate drive ICs with the gate lines, each scanning signal output terminal corresponding to a particular set of the sets of the gate lines, and supplying a scanning signal to the particular set, and time-dividing the scanning signal output from a particular scanning signal output terminal of one of the gate drive ICs and selectively applying the time-divided scanning signal to one of the gate lines of the particular set using one of the selection parts of a plurality of selection parts.

The method may comprise connecting a plurality of gate drive ICs with the gate lines and a plurality of source drive ICs with the data lines, a number of the source drive ICs smaller than a number of the gate drive ICs.

In another embodiment, a method of decreasing manufacturing cost of a liquid crystal display device comprises: obtaining a liquid crystal display panel comprising: a plurality of sets of adjacent gate lines; a plurality of data lines perpendicular to the gate lines; and a plurality of sets of pixel electrodes, each set of pixel electrodes containing at least two pixel electrodes, each set of pixels bounded by adjacent data lines and, at furthest, gate lines most distal from each other in adjacent sets of the sets of the adjacent gate lines, no pixel electrode overlapping any other pixel electrode; obtaining a plurality of gate drive ICs and a plurality of source drive ICs; and connecting the gate drive ICs with the gate lines and source drive ICs with the source lines.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, an LCD device according to embodiments of the present invention will be described with reference to the accompanying drawings.

Figure 1:
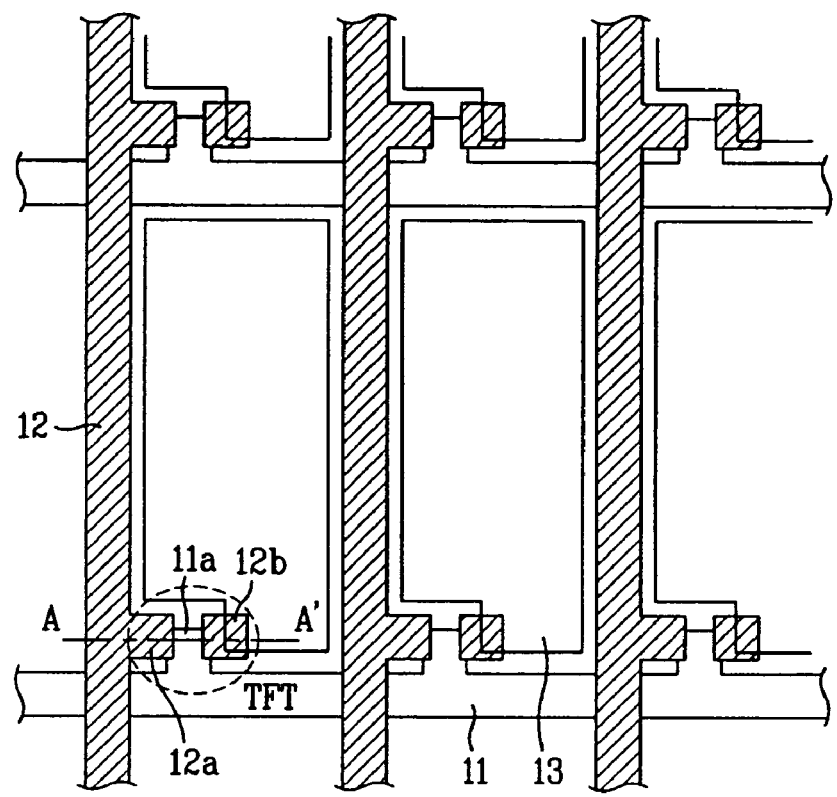
FIG. 1 is a plan view of a related art LCD device.
Figure 2:
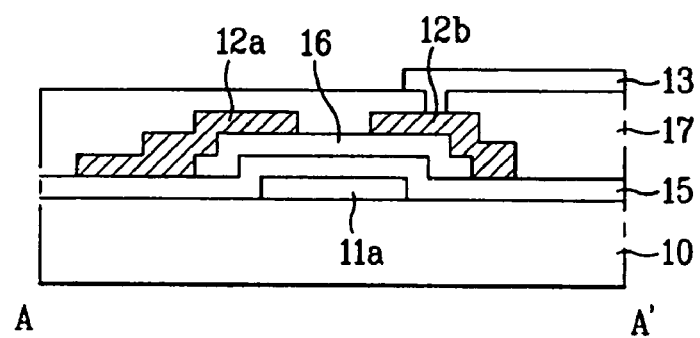
FIG. 2 is a cross-sectional view taken along line A-A' of FIG. 1.
Figure 3:
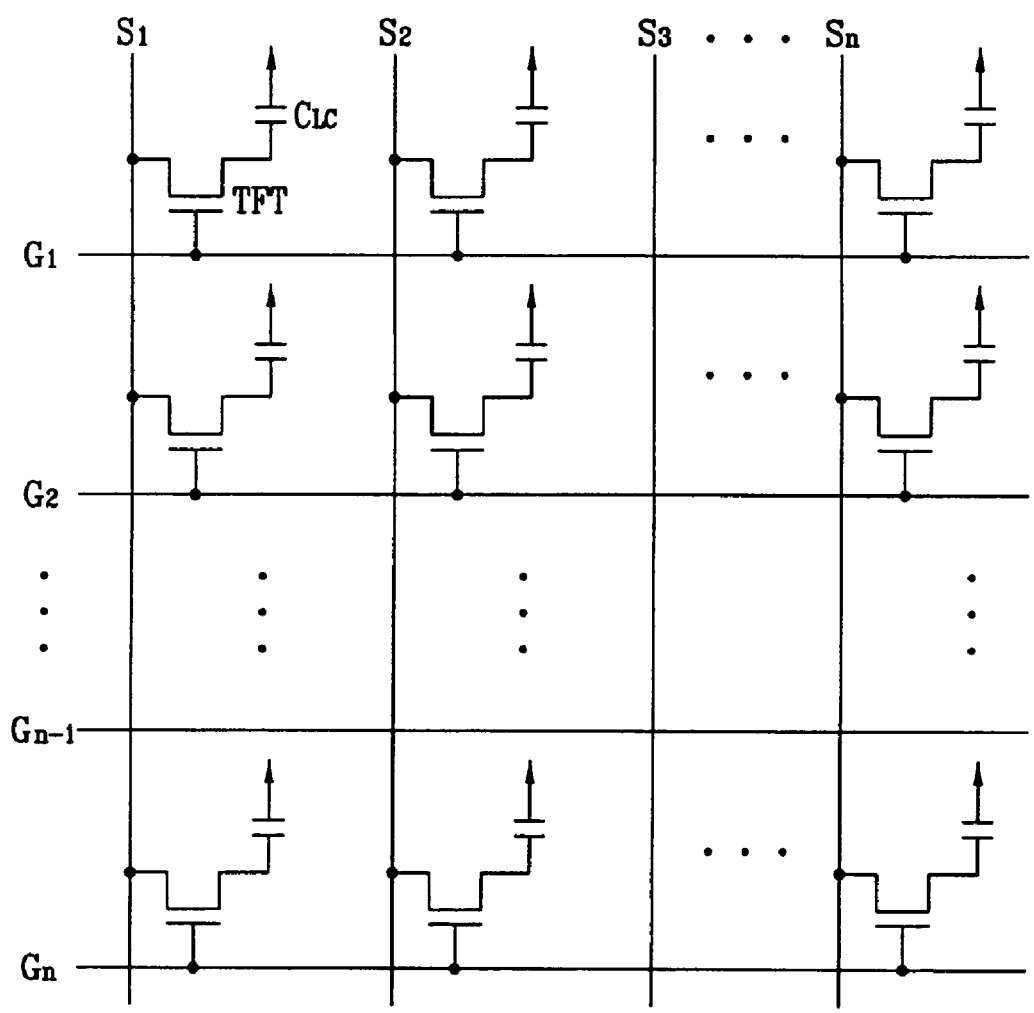
FIG. 3 is an equivalent circuit diagram of FIG. 1.
Figure 4:
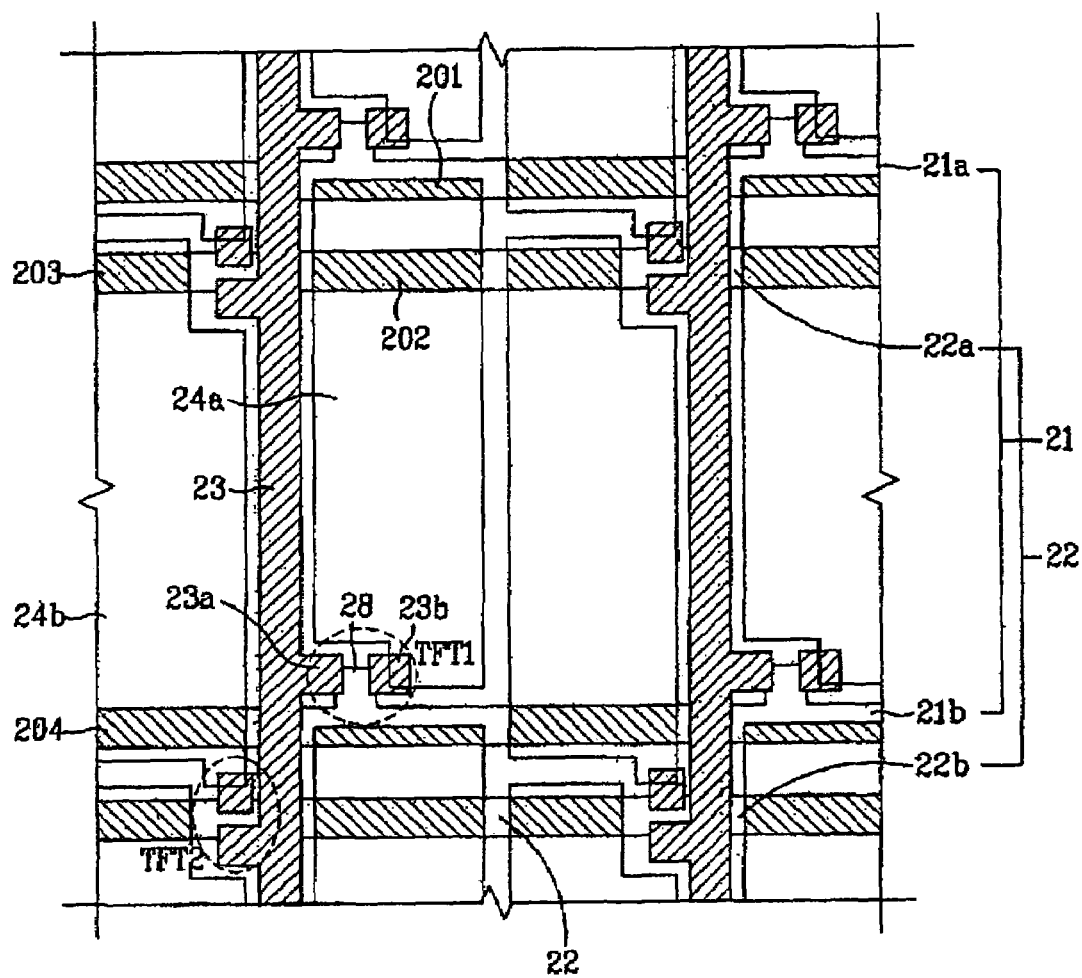
FIG. 4 is a plan view of an LCD device according to a first embodiment of the present invention.

FIG. 4 is a plan view of an LCD device according to a first embodiment of the present invention. As shown in FIG. 4, in the LCD device according to the present invention, data is provided in a time-divided manner to left and right side pixels of one data line. That is the LCD device according to the embodiment shown includes a plurality of pairs of gate lines, each pair of gate lines including first and second gate lines 21 and 22 adjacent to each other, and a plurality of data lines 23 perpendicular to the respective gate lines 21 and 22, thereby defining the respective left and right side pixel regions. A right side pixel electrode 24a is formed in the right side pixel region and is driven by the first gate line 21. A left side pixel electrode 24b is formed in the left side pixel region and is driven by the second gate line 22.

The first and second gate lines 21 and 22 are perpendicular to the data lines, and first and second thin film transistors TFT1 and TFT2 respectively drive the right and left side pixel regions corresponding to one data line. Also, the right side pixel electrode 24a, driven by the first thin film transistor TFT1 on the first gate line 21b, is overlapped with a first pair (pair of preceding gate lines) of the first and second gate lines 21a and 22a, thereby forming first and second storage capacitors 201 and 202. In addition, the left side pixel electrode 24b, driven by the second thin film transistor TFT2 on the second gate line 22b, is overlapped with the second gate line 22a of the first pair, and the first gate line of a second pair (pair of corresponding gate lines). In this case, each gate line 21a, 22a or 22a, 21b serves as one electrode of each storage capacitor 201, 202, 203 and 204, which is not the driving gate line 21b and 22b of each pixel region but the most adjacent gate line of the corresponding pixel region.

Figure 5:
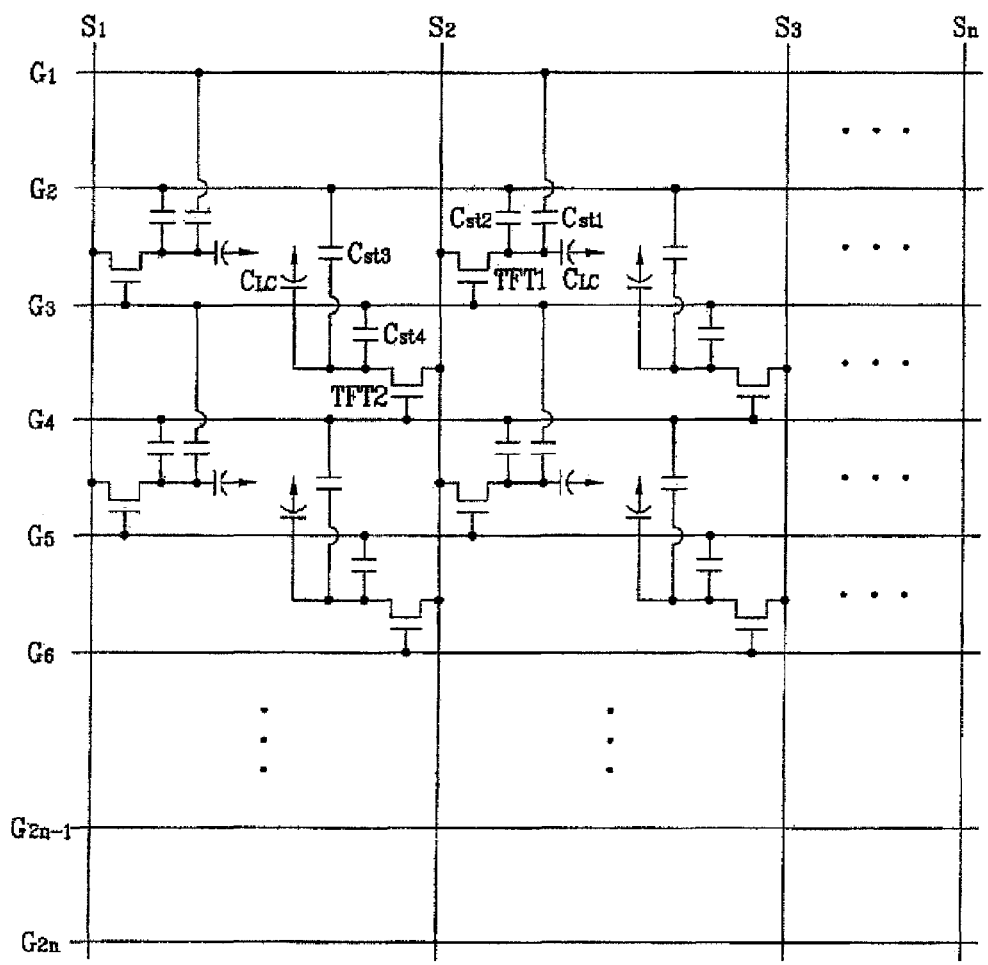
FIG. 5 is an equivalent circuit diagram of FIG. 4.

FIG. 5 is an equivalent circuit diagram of the LCD device of FIG. 4. Referring to FIG. 5 illustrating the circuit diagram of the LCD device according to the present invention, the number of gate lines is doubled as compared with the number of gate lines in the LCD device according to the related art. Meanwhile, the number of data lines is reduced to half.

In the right side pixel region of the data line 23, a drain electrode 23b of the first thin film transistor TFT1 is overlapped with the first and second gate lines 21a and 22a of the first pair, so that the first and second storage capacitors 201 and 202 are formed in parallel. In the left side pixel region of the data line 23, the third and fourth storage capacitors 203 and 204 are respectively interposed among the drain electrode 23b of the second thin film transistor TFT2, the second gate line 22a of the first pair, and the first gate line 21b of the second pair. At this time, the third and fourth storage capacitors 203 and 204 are formed in parallel. Thus, it is possible to obtain greater storage capacitance using the above embodiment than the related art method for forming the storage capacitor with the preceding gate method. Also, the method according to the above embodiment permits a reduction in each gate line width.

In the LCD device according to the above embodiment, the plurality of pairs of gate lines including the first and second gate lines 21 and 22 respectively cross the plurality of data line 23, thereby forming the two pixel regions at the respective crossing points. Also, the first and second thin film transistors TFT1 and TFT2 are formed in each pixel region. The first and second thin film transistors TFT1 and TFT2 are driven by scanning signals applied to the respective first and second gate lines 21 and 22. A liquid crystal capacitor CLC is formed between a common voltage applying line and the drain electrode of the first and second thin film transistors TFT1 and TFT2.

If the LCD device is formed according to the above embodiment in an XGA class display (1024×768), the left and right side pixel regions of one data line are driven according to one pair of gate lines. Such a display uses 1536 (1024×3/2) data lines and 1536 (768×2) gate lines. On comparing the LCD device according to the above embodiment with the related art LCD device having the same resolution, the number of data lines is halved and the number of gate lines is doubled.

When driving one frame, two sub-pixels (one main pixel is formed of the sub-pixels of R, G and B) are formed at crossing points between one pair of gate lines and one data line, so that a switching operation is performed for 1536× 768×2 sub-pixels. At this time, each data line sequentially responds to the signal applied to the adjacent pair of gate lines, whereby the data voltage is charged in the right and left sub-pixels in order, thereby displaying a picture image.

Although not shown, in the pixel structure of the LCD device shown in FIGS. 4 and 5 according to another embodiment of the present invention, it is possible to change the right and left side pixel structure of one data line. That is, the data voltage is charged in the left and right sub-pixels in order, thereby displaying a picture image. That is, the LCD device according to another embodiment of the present invention includes a plurality of pairs of gate lines including first and second gate lines 21 and 22 adjacent to each other and a plurality of data lines 23 perpendicular to the pairs of the gate lines, for defining a plurality of pixel regions. Each left side pixel electrode (not shown) is formed in each left side pixel region for being driven by the first gate line 21. Each right side pixel electrode (not shown) is formed in each right side pixel region for being driven by the second gate line 22.

At this time, the left side pixel electrode is overlapped with the first and second of a first pair (pair of preceding gate lines), thereby forming first and second storage capacitors.

Also, the right side pixel electrode is overlapped with the second gate line of the first pair, and the first gate line of a second pair (pair of corresponding gate lines), thereby forming third and fourth storage capacitors.

Figure 6:
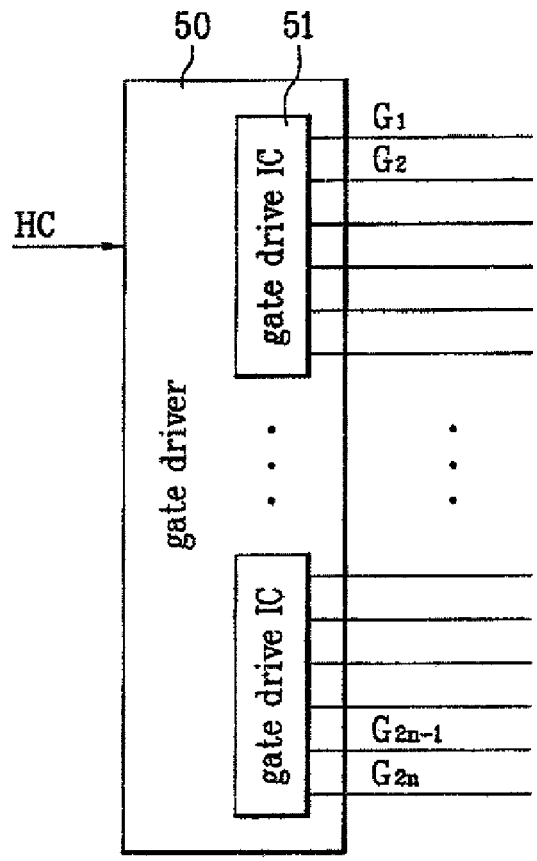
FIG. 6 is a block diagram of a gate driver driving a gate line of an LCD device according to the first embodiment of the present invention.
Figure 7:
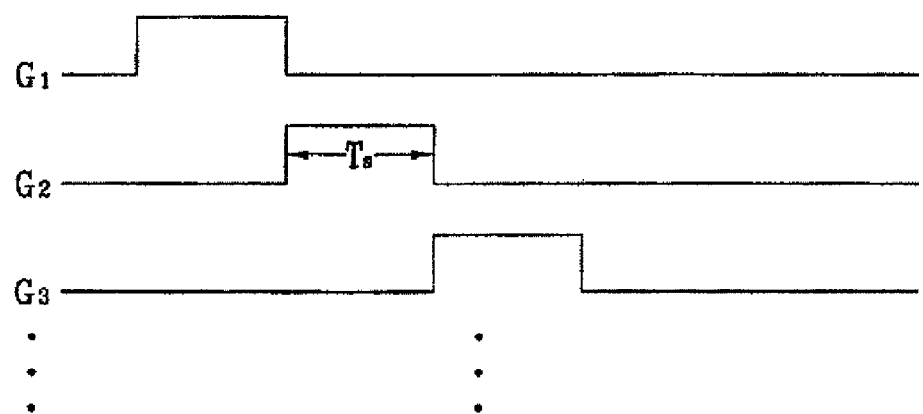
FIG. 7 is a timing view of a gate pulse clock signal applied to the gate driver of FIG. 6, and a signal output from the gate driver and applied to each gate line.

As mentioned above, a driving method of the LCD device according to the present invention, in which one data line is corresponding to one pair of gate lines, will be described with reference to the accompanying drawings. FIG. 6 is a block diagram of a gate drive driving a gate line of an LCD device according to the first embodiment of the present invention. FIG. 7 is a timing view of a gate pulse clock signal applied to the gate driver of FIG. 6, and a signal output from the gate driver and applied to each gate line.

As shown in FIG. 6 and FIG. 7, in the LCD device according to the first embodiment of the present invention, a gate driver 50 includes one or more gate drive ICs 51 driven by gate pulse clock signals HC. In a selection block of a scanning signal G1, G2, . . . output from the gate drive IC 51 in the LCD device according to the first embodiment, a pulse width of the scanning signal is ½ that of the related art LCD device having the same resolution. For example, if a picture is transmitted at 60 Hz (that is, a cycle of one frame is about 16.7 msec), if the LCD device is formed according to the first embodiment in an XGA class display having a resolution of 1024×768, there are 1536 data lines (512×3: each pixel R, G and B) and 1536 gatelines on an LCD panel of a display part. That is, the selection block Ts of the scanning signal G1, G2, . . . applied to each gate line is about 10.85 μs (16.7 msec/1536). Accordingly, in the related art LCD device having the same resolution as that of the LCD device according to the first embodiment, the gate pulse clock signal HC having the pulse width of 21.7 μs is applied to the 768 gate lines. Meanwhile, in the LCD device according to the first embodiment, the selection block of the scanning signal applied to each gate line is about 10.85 μs.

In the LCD device according to the first embodiment of the present invention, the number of the gate drive ICs 51 is doubled since the number of the gate lines is doubled. For example, if one gate drive IC 51 has 256 output pins, the LCD device uses 6 (1536/256) gate drive ICs 51.

Figure 8:
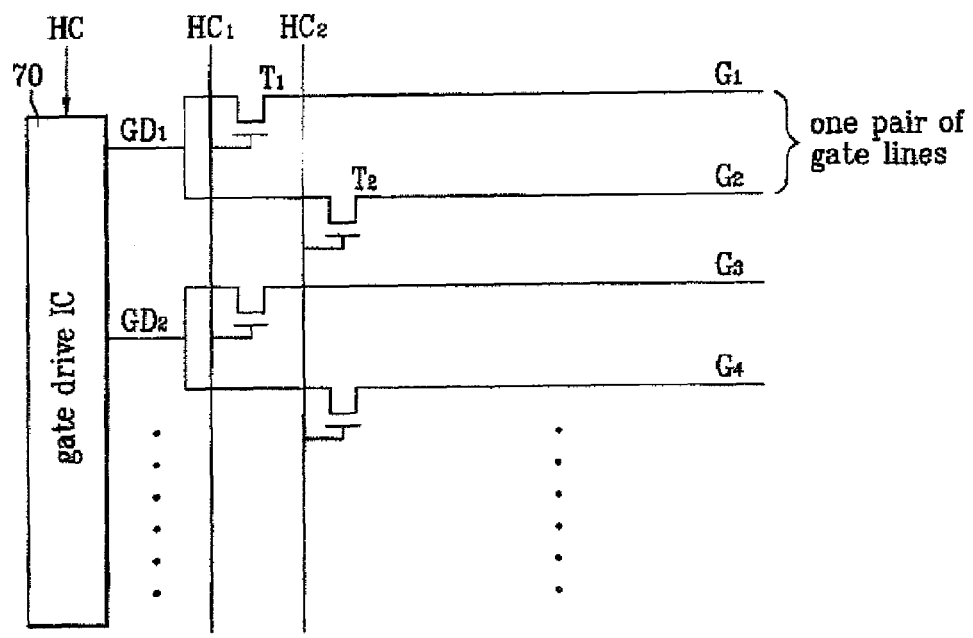
FIG. 8 is a block diagram of a gate driver driving a gate line of an LCD device according to the second embodiment of the present invention.
Figure 9:
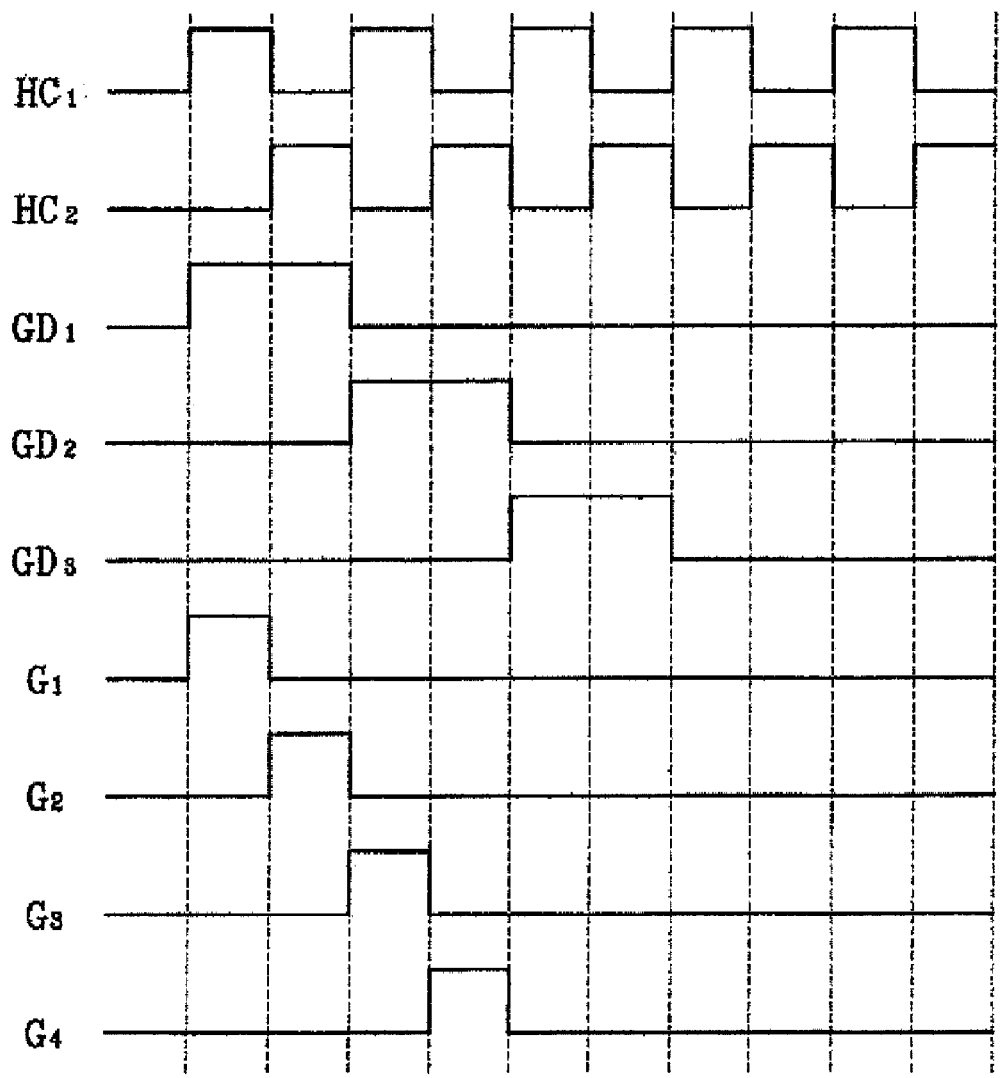
FIG. 9 is a timing view of a gate pulse clock signal and an output signal applied to the gate driver according to the second and third embodiments of the present invention.

FIG. 8 is a block diagram of a gate driver driving a gate line of an LCD device according to the second embodiment of the present invention. FIG. 9 is a timing view of a gate pulse clock signal and an output signal applied to the gate driver according to the second or third embodiment of the present invention.

Referring to FIG. 8, a gate driver of an LCD device according to the second embodiment of the present invention includes a gate drive IC 70 outputting a scanning signal GD1, GD2, . . . to each pair of gate lines, and switching parts T1 and T2 turned-on by first and second clock signals HC1 and HC2 applied from a system, for respectively applying signals G1, G2, G3, G4, . . . time-divided from the scanning signals GD1, GD2, . . . to the first and second gate lines of each pair.

The gate driver of the LCD device according to the second embodiment of the present invention includes the two switching parts T1 and T2 in each output terminal of the gate drive IC 70, so that it is possible to apply the gate signal G1, G2, G3, G4, . . . time-divided from the scanning signal GD1, GD2, . . . output from the gate drive IC 70. Unlike the LCD device according to the first embodiment of the present invention, in the LCD device according to the second embodiment of the present invention, it is possible to apply the gate signals G1, G2, G3, G4, . . . to the gate lines which are twice as many as those in the related art LCD device, with the gate drive ICs 70 corresponding to those in the related art LCD device having the same resolution.

That is, if the LCD device according to the second embodiment in which a picture is transmitted at 60 Hz (a cycle of one frame is about 16.7 msec) and the resolution is XGA class (1024×768), the gate driver of the LCD device according to the second embodiment of the present invention includes the three gate drive ICs 70, each having 256 output pins. At this time, each scanning signal GD1, GD2, . . . output from each gate drive IC 70 has a selection block of 21.7 μs. Accordingly, even though the number of the gate drive ICs 70 in the LCD device according to the second embodiment of the present invention corresponds to the number of the gate drive ICs in the LCD device according to the related art, it is possible to apply the gate signals to twice as many gate lines as those in the related art LCD device, thereby realizing a resolution corresponding to that of the related art LCD device.

In the gate driver of the LCD device according to the second embodiment of the present invention, each output terminal of the gate drive IC 70 is divided into two parallel lines. Also, each of the first and second clock signals HC1 and HC2 has ½ cycle of gate shift clock, and the first and second clock signals have a phase difference at 180°. The two lines of the output terminal respectively have the first and second switching parts T1 and T2. The first and second clock signals HC1 and HC2 are respectively applied to the first and second switching parts T1 and T2, so that the first and second switching parts T1 and T2 apply the gate signal G1, G2, G3, G4, . . . to each gate line. That is, the Pre-half gate signal G1, G3, G5, . . . of the scanning signal GD1, GD2, GD3, . . . is applied to the first gate line, and the Post-half gate signal G2, G4, G6, . . . of the scanning signal GD1, GD2, GD3, . . . is applied to the second gate line.

Figures 10, 11:
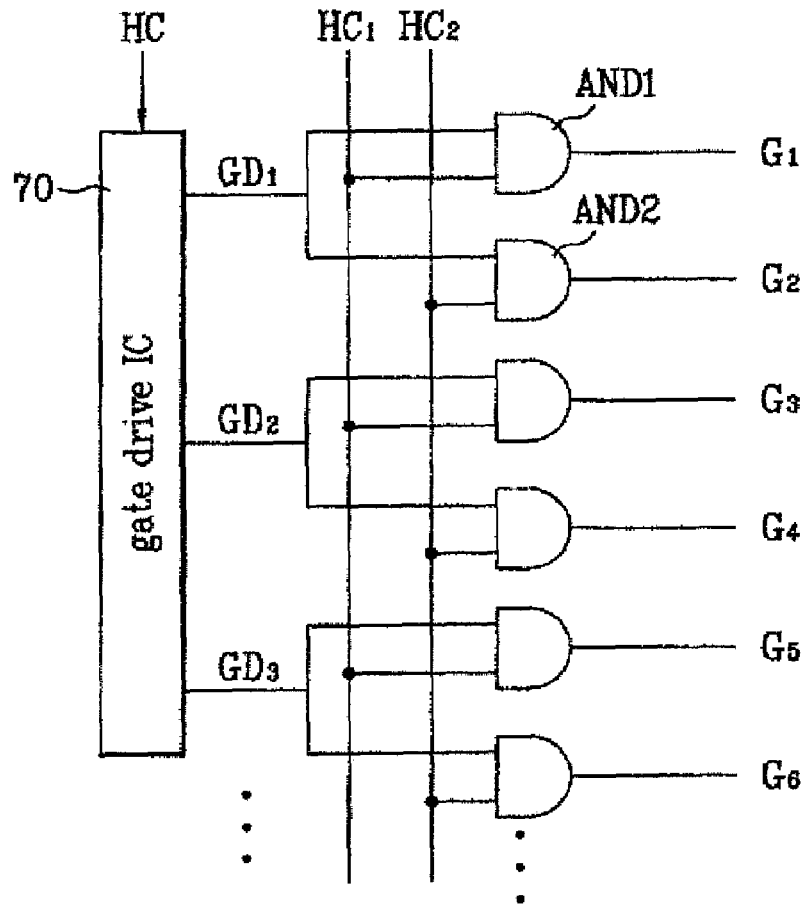
FIG. 10 is a circuit diagram of a gate driver driving a gate line in an LCD device according to the third embodiment of the present invention.
FIG. 11 is a truth table illustrating that a gate line is selectively driven according to a clock signal when driving a gate line of an LCD device according to the second and third embodiments of the present invention.

As shown in FIG. 10, for outputting the scanning signal GD1, GD2, . . . in the gate drive IC 70, the gate shift clock has a pulse width of 21.7 μs, and each of the first and second clock signals HC1 and HC2, having ½ cycle of the gate shift clock HC, has a pulse width of 10.85 μs. Also, each gate line G1, G2, G3, . . . has a selection block during each high level of the first and second clock signals HC1 and HC2.

Hereinafter, a driving method of the gate line by using the gate driver of the LCD device according to the second embodiment of the present invention will be described as follows.

When the first scanning signal GD1 is output from the gate drive IC 70, the first gate signal G1 is applied to the first gate line when the first clock signal HC1 is high. Subsequently, the second gate signal G2 is applied to the second gate line when the second clock signal HC2 is high. Thus, even though the gate lines of the LCD device according to the second embodiment are twice as many as those in the LCD device according to the related art, the selection block of the signal applied to each gate line is about 10.85 μs in the LCD device according to the second embodiment, which is the half of the selection block of the scanning signal GD1, GD2, . . . , so that the LCD device spends the same time in scanning the first gate line to the last gate line in each frame as that according to the related art. Examples of the waveforms for the various signals are shown in FIG. 9.

FIG. 10 is a circuit diagram of a gate driver driving a gate line in an LCD device according to the third embodiment of the present invention. As shown in FIG. 10, the LCD device according to the third embodiment of the present invention includes a gate drive IC 70, and AND gates AND1 and AND2. At this time, the gate drive IC outputs a scanning signal GD1, GD2, . . . to each pair of gate lines. Also, the AND gates AND1 and AND2 selectively receive and logically combine first and second clock signals HC1 and HC2, and the scanning signal GD1, GD2, . . . , and then apply a gate signal G1, G2, G3, G4, . . . time-divided from the scanning signal GD1, GD2, . . . to first and second gate lines of each pair.

In the LCD device according to the third embodiment of the present invention, a gate driver includes the two AND gates AND1 and AND2 in each output terminal of the gate drive IC 70. Also, the scanning signal GD1, GD2, . . . output from the gate drive IC 70 is time-divided into two and then respectively output to the first and second gate lines. Unlike the LCD device according to the first embodiment of the present invention, in the LCD device according to the third embodiment of the present invention, it is possible to apply the signals to twice as many gate lines as those in the related art LCD device, with the number of the gate drive ICs 70 corresponding to that of the related art LCD device.

As before, if a picture is transmitted at 60 Hz (a cycle of one frame is about 16.7 msec), and the LCD device according to the third embodiment of the present invention has a resolution of an XGA class display (1024×768), three gate drive ICs are used, each gate drive IC having 256 output pins. Each gate drive IC 70 outputs the scanning signal GD1, GD2, GD3, . . . having a pulse width of 21.7 μs. The gate drive IC of the third embodiment has the same output as that of the gate drive IC in the related art LCD device having the same resolution.

Each output terminal of the gate drive IC 70 is divided into two parallel lines. Also, the first gate line includes the first AND gate AND1 for receiving and logically combining the first clock signal HC1 having a ½ cycle of the gate shift clock having the pulse width of 21.7 μs, and the scanning signal GD1, GD2, . . . which is the output signal of the gate drive IC 70. The second gate line includes the second AND gate AND2 for receiving and logically combining the second clock signal HC2 having a phase difference of 180° with respect to the first clock signal HC1, and the scanning signal GD1, GD2, . . . , then the logically combined value is output. Thus, the scanning signal G1, G2, G3, G4, . . . , Gn is provided to the first and second gate lines of each pair in a time-divided manner.

Even though there are twice as many gate lines of the LCD device according to the third embodiment as those in the LCD deice according to the related art, a selection block of the signal applied to each gate line is the half of that according to the related art, so that the LCD device spends the same time in scanning the first gate line to the last gate line at each frame as that according to the related art.

Figure 12:
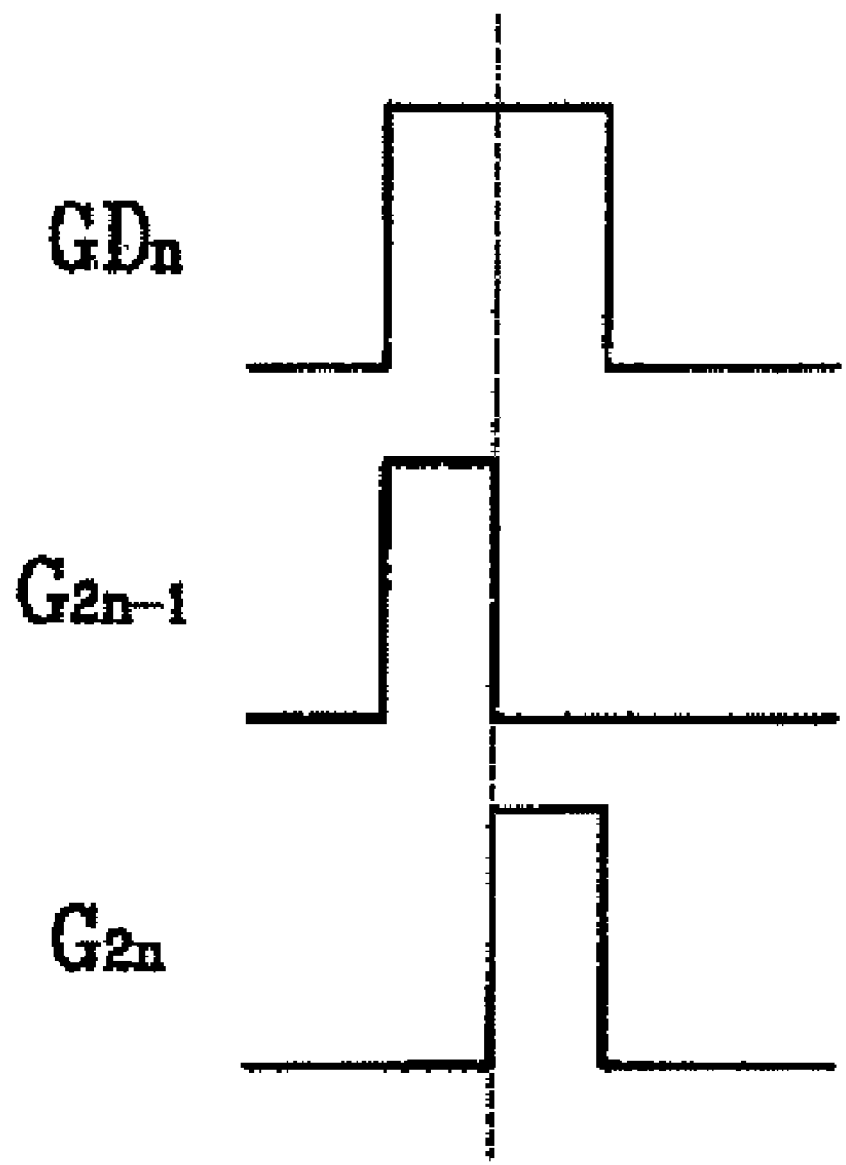
FIG. 12 is a timing view illustrating that an output of a gate driver is provided in a time-divided manner when applying one pair of gate lines of an LCD device according to the second and third embodiments of the present invention.

FIG. 11 is a truth table illustrating that a gate line is selectively driven according to a clock signal when driving a gate line of an LCD device according to the second and third embodiments of the present invention; and FIG. 12 is a timing view illustrating that an output of a gate driver is provided in a time-divided manner when applying one pair of gate lines of an LCD device according to the second and third embodiments of the present invention.

As shown in FIG. 11, in the gate driver according to the second and third embodiments of the present invention, the gate signal G1, $G^3$, . . . , $G^{2n-1}$ time-divided from the scanning signal $GD^1$, $GD^2$, . . . , $G^{Dn}$ output from the gate drive IC 70 is applied as the first gate line signal at the high level of the first clock signal HC1, and the gate signal $G^2$, $G^4$, . . . , $G^{2n}$, is applied as the second gate line signal at the high level of the second clock signal. At this time, the wave applied to each gate line is shown in FIG. 12.

Hereinafter, the source driver corresponding to the gate driver in the LCD device according to embodiments of the present invention will be described in brief.

In the LCD device according to embodiments of the present invention, as the number of data lines is halved, the number of source drive ICs is also halved compared with the related art. A decrease in the number of source drive ICs lowers manufacturing cost since source drive ICs are expensive and require high power consumption. In the embodiments of the present invention that are shown, the pair of gate lines crosses the data line, whereby the two pixel regions are formed at the crossing point. That is, even though the number of source drive ICs is halved, the number of pixel regions is not changed at the horizontal line. Thus, in the source driver of the LCD device according to embodiments of the present invention, a pitch margin of a data pad doubles that of the LCD device according to the related art. If the LCD panel is formed having the same size as that according to the related art, it is possible to realize simplified manufacturing process steps in forming a LCD panel having the high resolution.

For maintaining the high resolution in the same size LCD panel, the pitch of the data pad is decreased as the number of data lines is decreased, and the pitch of TCP or COF opposing and bonded to the data pad is decreased. Accordingly, it would be useful to improve accuracy in the devices for the module process mounting the TCP to the LCD panel, increasing the complexity and making it hard to obtain a simplified manufacturing process.

Using the pixel structure according to embodiments of the present invention, the pitch margin of the data pad and TCP doubles that of the related art LCD device having the same resolution as that according to embodiments of the present invention. That is, as the resolution of the LCD panel becomes high, the pitch margin of the data pad and TCP increases corresponding to the increasing number of data lines.

In the LCD device according to embodiments of the present invention, even though the number of gate lines is doubled, the number of data lines is halved. In addition, it is possible to form a storage capacitor at the overlapping portion between one pair of gate lines and the pixel electrode, thereby preventing the aperture ratio from being low.

As mentioned above, the LCD device according to embodiments of the present invention has the following advantages.

In the LCD device according to embodiments of the present invention, the number of data lines is halved, so that the pitch margin of the data pad is double that of the related art LCD device, thereby simplifying the realization of high resolution in the same size LCD panel.

In a thin film transistor formed by an amorphous silicon layer, the drive IC is external to the LCD panel and the number of gate drive ICs is doubled, thereby using an additional transistor for driving the drive IC. However, the number of source drive ICs is halved. At this time, the source drive IC is more expensive than the gate drive IC, and the source drive IC has high power consumption. Thus, in the LCD device according to embodiments of the present invention, the number of source drive ICs is halved, thereby decreasing manufacturing cost and power consumption.

Meanwhile, when forming the thin film transistor with polysilicon as the semiconductor layer, thereby realizing rapid response, the drive IC may be mounted in the LCD panel. In this respect, even though the number of gate lines is doubled, additional cost does not exist due to the gate drive IC.

In the preceding gate line or storage line method, one line electrode is overlapped with the pixel electrode for forming the storage capacitor. Meanwhile, in embodiments of the present invention, the pixel electrode is overlapped with the two gate lines for forming the storage capacitor, so that it is possible to maintain the same storage capacitance and to decrease the gate line width, thereby improving the aperture ratio by halving the number of data lines and decreasing the gate line width.

It will be apparent to those skilled in the art that various modifications and variations can be made in embodiments of the present invention. Thus, it is intended that the present invention covers the modifications and variations of this invention within the scope of the appended claims and their equivalents.

What is claimed is:

1. A liquid crystal display device comprising:
a plurality of pairs of gate lines including first and second gate lines adjacent to each other;
a plurality of data lines perpendicular to the first and second gate lines, wherein a respective data line and a respective pair of gate lines define a left side pixel region with one gate line from the respective pair of gate lines and a right side pixel region with the other gate line, at respective crossing points; and
left and right side pixel electrodes, respectively formed in the left and right side pixel regions, and selectively driven by switching-parts of the first and second gate lines, respectively,
wherein each of the left and right side pixel electrodes overlaps greater than one gate line.

2. The liquid crystal display device of claim 1, wherein the first and second gate lines of one pair of gate lines respectively drive the left and right side pixel electrodes connected with the same data line.

3. The liquid crystal display device of claim 1, wherein the left and right side pixel electrodes are overlapped with a preceding or corresponding pair of the gate lines.

4. The liquid crystal display device of claim 3, wherein the right side pixel electrode is overlapped with the first and second gate lines of the preceding pair, and the left side pixel electrode is overlapped with the first gate line of the corresponding pair and the second gate line of the preceding pair.

5. The liquid crystal display device of claim 4, wherein storage capacitors are formed at an overlapping portion between the left or right side pixel electrode and each gate line.

6. The liquid crystal display device of claim 3, wherein the left side pixel electrode is overlapped with the first and second gate lines of the preceding pair, and the right side pixel electrode is overlapped with the first gate line of the corresponding pair and the second gate line of the preceding pair.

7. The liquid crystal display device of claim 6, wherein storage capacitors are formed at an overlapping portion between the left or right side pixel electrode and each gate line.

8. The liquid crystal display device of claim 1, further comprising a plurality of source drive ICs, a number of source drive ICs equal to a number of colors in each pixel region times a number of data lines divided by twice a number of outputs in each source drive IC.

9. The liquid crystal display device of claim 1, further comprising a plurality of the gate drive ICs, each gate drive IC having a plurality of scanning signal output terminals, each scanning signal output terminal corresponding to a particular pair of the pairs of the gate lines and supplying a scanning signal to the particular pair; and a plurality of the selection parts, each selection part time-dividing the scanning signal output from a particular scanning signal output terminal of one of the gate drive ICs and selectively applying the time-divided scanning signal to the first or second gate line of the particular pair.

10. The liquid crystal display device of claim 9, wherein the display device is an XGA class display which contains 1536 data lines and 1536 gate lines.

11. The liquid crystal display device of claim 10, wherein if a picture is transmitted at 60 Hz, a selection block of a scanning signal applied to each gate line is about 10.85 µs.

12. The liquid crystal display device of claim 10, wherein if a picture is transmitted at 60 Hz, a selection block of a scanning signal applied to each gate line is about 21 µs.

13. The liquid crystal display device of claim 10, wherein exactly 6 gate drive ICs are provided, each gate drive IC having 256 pins.

14. The liquid crystal display device of claim 10, wherein exactly 3 gate drive ICs are provided, each gate drive IC having 256 pins.

15. The liquid crystal display device of claim 10, further comprising exactly four source drive ICs, each source drive IC having 384 pins.

16. The liquid crystal display device of claim 9, further comprising a plurality of source drive ICs, a number of the source drive ICs smaller than a number of the gate drive ICs.

17. A liquid crystal display device comprising:

a plurality of pairs of gate lines, each pair of gate lines including first and second gate lines adjacent to each other;

a plurality of data lines perpendicular to the pair of the first and second gate lines, wherein a respective data line and a respective pair of gate lines define a left side pixel region with one gate line from the respective pair of gate lines and a right side pixel region with the other gate line at respective crossing points;

left and right side pixel electrodes, respectively formed in the left and right side pixel regions, and selectively driven by switching-parts of the first and second gate lines, respectively, a gate drive IC having a scanning signal output terminal corresponding to one of the pairs of the gate lines, the scanning signal output terminal supplying a scanning signal; and a selection part time-dividing the scanning signal output from the gate drive IC and selectively applying the time-divided scanning signal to the first or second gate line of the one of the pairs of the gate lines, wherein each of the left and right side pixel electrodes overlaps greater than one gate line.

18. The liquid crystal display device of claim 17, wherein the scanning signal output from the gate drive IC is divided into a first signal and a second signal which are then applied to the first and second gate lines, respectively.

19. The liquid crystal display device of claim 17, wherein the selection part includes:

a first selection switch activated by a first clock signal to apply the scanning signal to the first gate line of the one of the pairs of gate lines; and a second selection switch activated by a second clock signal having a phase difference of 180° with respect to the first clock signal, the second clock signal applying the scanning signal to the second gate line of the one of the pairs of gate lines when activated.

20. The liquid crystal display device of claim 17, wherein the selection part includes:

a first logic circuit that combines the scanning signal and a first clock signal, an output of the first logic circuit connected with the first gate line of the one of the pairs of gate lines; and a second logic circuit that combines the scanning signal and a second clock signal, the second clock signal having a phase difference of 180° with respect to the first clock signal, the first logic circuit connected with the second gate line of the one of the pairs of gate lines.

21. The liquid crystal display device of claim 17, wherein the selection part includes:

a first AND gate receiving and logically combining the scanning signal and a first clock signal, then outputting the combination to the first gate line of the one of the pairs of gate lines; and a second AND gate receiving and logically combining the scanning signal and a second clock signal having a phase difference of 180° with respect to the first clock signal, then outputting the combination to the second gate line of the one of the pairs of gate lines.

22. The liquid crystal display device of claim 17, further comprising a plurality of source drive ICs, a number of source drive ICs equal to a number of colors in each pixel region times a number of data lines divided by twice a number of outputs in each source drive IC.

23. The liquid crystal display device of claim 17, further comprising a plurality of the gate drive ICs, each gate drive IC having a plurality of scanning signal output terminals, each scanning signal output terminal corresponding to a particular pair of the pairs of the gate lines and supplying a scanning signal to the particular pair; and a plurality of the selection parts, each selection part time-dividing the scanning signal output from a particular scanning signal output terminal of one of the gate drive ICs and selectively applying the time-divided scanning signal to the first or second gate line of the particular pair.

24. The liquid crystal display device of claim 23, wherein the display device is an XGA class display which contains 1536 data lines and 1536 gate lines.

25. The liquid crystal display device of claim 24, wherein if a picture is transmitted at 60 Hz, a selection block of a scanning signal applied to each gate line is about 21.7 µs.

26. The liquid crystal display device of claim 24, further comprising exactly four source drive ICs, each source drive IC having 384 pins.

27. The liquid crystal display device of claim 23, further comprising a plurality of source drive ICs, a number of the source drive ICs smaller than a number of the gate drive ICs.

28. A liquid crystal display device comprising:

a plurality of sets of adjacent gate lines;

a plurality of data lines perpendicular to the gate lines;

a plurality of sets of pixel regions, each set of pixel regions containing at least two pixel regions and bounded by adjacent data lines and, at furthest, gate lines most distal from each other in adjacent sets of the sets of the adjacent gate lines, no pixel region overlapping any other pixel region, wherein a respective data line and a respective set of adjacent gate lines define a respective left side pixel electrode with one gate line from the respective set of adjacent gate lines and a respective right side pixel electrode with another gate line, at respective crossing points; and a plurality of sets of pixel electrodes, each pixel electrode disposed in a particular pixel region and overlapping greater than one gate line, wherein at least one pixel electrode of adjacent pixel electrodes either overlaps at least two gate lines of one of the sets of adjacent gate lines or overlaps one of the gate lines of a first set of the sets of adjacent gate lines and one of the gate lines of a second set of the sets of adjacent gate lines.

29. The liquid crystal display device of claim 28, wherein adjacent pixel electrodes overlap different gate lines.

30. The liquid crystal display device of claim 28, wherein each pixel electrode overlaps exactly two gate lines.

31. The liquid crystal display device of claim 28, wherein the at least one pixel electrode of adjacent pixel electrodes overlaps the at least two gate lines of one of the sets of adjacent gate lines.

32. The liquid crystal display device of claim 28, wherein the at least one pixel electrode of adjacent pixel electrodes overlaps the one of the gate lines of a first set of the sets of adjacent gate lines and the one of the gate lines of a second set of the sets of adjacent gate lines.

33. The liquid crystal display device of claim 28, wherein each set of adjacent gate lines comprises exactly two adjacent gate lines.

34. The liquid crystal display device of claim 28, further comprising a plurality of storage capacitors, each storage capacitor formed by the overlap between one of the pixel electrodes and one of the gate lines.

35. The liquid crystal display device of claim 28, further comprising:
a gate drive IC having a scanning signal output terminal corresponding to at least one of the sets of adjacent gate lines, the scanning signal output terminal supplying a scanning signal; and
a selection part time-dividing the scanning signal output from the gate drive IC and selectively applying the time-divided scanning signal to the gate lines of the one of the sets of adjacent gate lines.

36. The liquid crystal display device of claim 35, wherein the scanning signal output from the gate drive IC is divided into a plurality of output signals and each output signal is supplied to a different gate line of the one of the sets of gate lines.

37. The liquid crystal display device of claim 35, wherein the selection part includes a plurality of selection switches which are each activated at different, non-overlapping times.

38. The liquid crystal display device of claim 37, wherein the selection switches are activated by different clock signals.

39. The liquid crystal display device of claim 35, wherein the selection part includes a plurality of logic circuits which are each activated at different, non-overlapping times.

40. The liquid crystal display device of claim 39, wherein each logic circuit combines the scanning signal and a different clock signal of a plurality of clock signals.

41. The liquid crystal display device of claim 40, wherein the logic circuits are AND gates.

42. The liquid crystal display device of claim 35, wherein the one of the sets of adjacent gate lines includes exactly two gate lines: a first gate line and a second gate line.

43. The liquid crystal display device of claim 42, wherein the selection part includes:
a first AND gate receiving and logically combining the scanning signal and a first clock signal, then outputting the combination of the scanning signal and the first clock signal to the first gate line; and
a second AND gate receiving and logically combining the scanning signal and a second clock signal having a phase difference of 180° with respect to the first clock signal, then outputting the combination of the scanning signal and the second clock signal to the second gate line.

44. The liquid crystal display device of claim 28, further comprising a plurality of source drive ICs, a number of source drive ICs equal to (a number of colors in each pixel region times a number of data lines) divided by (a number of outputs in each source drive IC times a number of adjacent gate lines in each set of the adjacent gate lines).

45. The liquid crystal display device of claim 28, further comprising a plurality of gate drive ICs, each gate drive IC having a plurality of scanning signal output terminals, each scanning signal output terminal corresponding to a particular set of the sets of the gate lines and supplying a scanning signal to the particular set; and
a plurality of selection parts, each selection part time-dividing the scanning signal output from a particular scanning signal output terminal of one of the gate drive ICs and selectively applying the time-divided scanning signal to one of the gate lines of the particular set.

46. The liquid crystal display device of claim 28, further comprising a plurality of gate drive ICs supplying signals to the gate lines and a plurality of source drive ICs supplying signals to the data lines, wherein a number of the source drive ICs is smaller than a number of the gate drive ICs.

47. A method of fabricating a liquid crystal display device, the method comprising:
forming a plurality of sets of adjacent gate lines;
forming a plurality of data lines perpendicular to the gate lines; and
forming a plurality of sets of pixel electrodes, each set of pixel electrodes containing at least two pixel electrodes, each set of pixels bounded by adjacent data lines and, at furthest, gate lines most distal from each other in adjacent sets of the sets of the adjacent gate lines, wherein a respective data line and a respective set of adjacent gate lines define a respective left side pixel electrode with one gate line from the respective set of adjacent gate lines and a respective right side pixel electrode with another gate line, at respective crossing points, each pixel electrode overlapping greater than one gate line and no pixel electrode overlapping any other pixel electrode,
wherein at least one pixel electrode of adjacent pixel electrodes either overlaps at least two gate lines of one of the sets of adjacent gate lines or overlaps one of the gate lines of a first set of the sets of adjacent gate lines and one of the gate lines of a second set of the sets of adjacent gate lines.

48. The method of claim 47, further comprising forming the pixel electrodes such that adjacent pixel electrodes overlap different gate lines.

49. The method of claim 47, further comprising forming the pixel electrodes such that each pixel electrode overlaps exactly two gate lines.

50. The method of claim 47, wherein the at least one pixel electrode of adjacent pixel electrodes overlaps the at least two gate lines of one of the sets of adjacent gate lines.

51. The method of claim 47, wherein the at least one pixel electrode of adjacent pixel electrodes overlaps the one of the gate lines of a first set of the sets of adjacent gate lines and the one of the gate lines of a second set of the sets of adjacent gate lines.

52. The method of claim 47, further comprising forming the gate lines such that each set of adjacent gate lines comprises exactly two adjacent gate lines.

53. The method of claim 47, further comprising forming a plurality of storage capacitors, each storage capacitor formed by the overlap between one of the pixel electrodes and one of the gate lines.

54. The method of claim 47, further comprising connecting a scanning signal output terminal of a gate drive IC with at least one of the sets of adjacent gate lines, the scanning signal output terminal supplying a scanning signal, time-dividing the scanning signal output from the gate drive IC using a selection part, and selectively applying the time-divided scanning signal to the gate lines of the one of the sets of adjacent gate lines.

55. The method of claim 54, further comprising dividing the scanning signal output from the gate drive IC into a plurality of output signals and supplying each output signal to a different gate line of the one of the sets of gate lines.

56. The method of claim 54, further comprising activating each of a plurality of selection switches of the selection part at different, non-overlapping times.

57. The method of claim 56, further comprising activating the selection switches using different clock signals.

58. The method of claim 54, further comprising activating each of a plurality of logic circuits of the selection pad at different, non-overlapping times.

59. The method of claim 58, further comprising providing the logic circuits such that each logic circuit combines the scanning signal and a different clock signal of a plurality of clock signals.

60. The method of claim 59, further comprising providing AND gates as the logic circuits.

61. The method of claim 54, further comprising forming the gate lines such that the one of the sets of adjacent gate lines includes exactly two gate lines: a first gate line and a second gate line.

62. The method of claim 61, further comprising receiving and logically combining the scanning signal and a first clock signal and then outputting the combination of the scanning signal and the first clock signal to the first gate line using a first AND gate, and receiving and logically combining the scanning signal and a second clock signal having a phase difference of 180° with respect to the first clock signal and then outputting the combination of the scanning signal and the second clock signal to the second gate line using a second AND gate.

63. The method of claim 47, further comprising connecting a number of source drive ICs equal to (a number of colors in each pixel region in which each pixel electrode is formed times a number of data lines) divided by (a number of outputs in each source drive IC times a number of adjacent gate lines in each set of the adjacent gate lines) with the data lines.

64. The method of claim 47, further comprising connecting a plurality of scanning signal output terminals of a plurality of gate drive ICs with the gate lines, each scanning signal output terminal corresponding to a particular set of the sets of the gate lines, and supplying a scanning signal to the particular set, and time-dividing the scanning signal output from a particular scanning signal output terminal of one of the gate drive ICs and selectively applying the time-divided scanning signal to one of the gate lines of the particular set using one of the selection parts of a plurality of selection parts.

65. The method of claim 47, further comprising connecting a plurality of gate drive ICs with the gate lines and a plurality of source drive ICs with the data lines, a number of the source drive ICs smaller than a number of the gate drive ICs.

66. A method of decreasing manufacturing cost of a liquid crystal display device, the method comprising:
obtaining a liquid crystal display panel comprising:
a plurality of sets of adjacent gate lines;
a plurality of data lines perpendicular to the gate lines; and
a plurality of sets of pixel electrodes, each set of pixel electrodes containing at least two pixel electrodes, each set of pixels bounded by adjacent data lines and, at furthest, gate lines most distal from each other in adjacent sets of the sets of the adjacent gate lines, no pixel electrode overlapping any other pixel electrode, wherein a respective data line and a respective set of adjacent gate lines define a respective left side pixel electrode with one gate line from the respective set of adjacent gate lines and a respective right side pixel electrode with another gate line, at respective crossing points, and wherein at least one pixel electrode of adjacent pixel electrodes either overlaps at least two gate lines of one of the sets of adjacent gate lines or overlaps one of the gate lines of a first set of the sets of adjacent gate lines and one of the gate lines of a second set of the sets of adjacent gate lines;
obtaining a plurality of gate drive ICs and a plurality of source drive ICs; and
connecting the gate drive ICs with the gate lines and source drive ICs with the source lines.

* * * * *

UNITED STATES PATENT AND TRADEMARK OFFICE
CERTIFICATE OF CORRECTION

PATENT NO. : 7,256,759 B2 Page 1 of 1
APPLICATION NO. : 10/743173
DATED : August 14, 2007
INVENTOR(S) : Woo Hyun Kim et al.

It is certified that error appears in the above-identified patent and that said Letters Patent is hereby corrected as shown below:

<u>In the Claims</u>

Column 17, in claim 12, line 17, after "each gate line is about" delete "21" and substitute --21.7-- in its place.

Signed and Sealed this

First Day of April, 2008

JON W. DUDAS
*Director of the United States Patent and Trademark Office*